(12) United States Patent
Cruz Huertas et al.

(10) Patent No.: US 11,017,129 B2
(45) Date of Patent: May 25, 2021

(54) TEMPLATE SELECTOR

(71) Applicant: INTERNATIONAL BUSINESS MACHINES CORPORATION, Armonk, NY (US)

(72) Inventors: Luis Carlos Cruz Huertas, San Pedro (CR); Rick A. Hamilton, II, Charlottesville, VA (US); Ninad Sathaye, Pune (IN); Edgar A. Zamora Duran, Heredia (CR)

(73) Assignee: International Business Machines Corporation, Armonk, NY (US)

(*) Notice: Subject to any disclaimer, the term of this patent is extended or adjusted under 35 U.S.C. 154(b) by 516 days.

(21) Appl. No.: 15/954,672

(22) Filed: Apr. 17, 2018

(65) Prior Publication Data
US 2019/0318045 A1    Oct. 17, 2019

(51) Int. Cl.
*G06F 30/00* (2020.01)
*G06F 16/248* (2019.01)
*G06F 16/28* (2019.01)
*G06F 111/02* (2020.01)
*G06F 111/20* (2020.01)

(52) U.S. Cl.
CPC ............ *G06F 30/00* (2020.01); *G06F 16/248* (2019.01); *G06F 16/285* (2019.01); *G06F 2111/02* (2020.01); *G06F 2111/20* (2020.01)

(58) Field of Classification Search
CPC ...... G06F 30/00; G06F 16/248; G06F 16/285; G06F 2111/02; G06F 2111/20
USPC ........................................................... 703/6
See application file for complete search history.

(56) References Cited

U.S. PATENT DOCUMENTS

| | | |
|---|---|---|
| 6,443,796 B1 | 9/2002 | Shackelford |
| 7,316,567 B2 | 1/2008 | Hsieh et al. |
| 7,555,658 B2 | 6/2009 | Vahid et al. |
| 8,079,890 B2 | 12/2011 | Seligman |
| 8,221,182 B2 | 7/2012 | Seymour et al. |
| 2011/0087479 A1 | 4/2011 | Baszucki et al. |

(Continued)

FOREIGN PATENT DOCUMENTS

| | | |
|---|---|---|
| CN | 101185108 A | 5/2008 |
| WO | WO2016075081 A1 | 5/2016 |

OTHER PUBLICATIONS

Rahim, Lukman Ab., "Analysis of Design Patterns in OpenNebula", 2014, IEEE. (Year: 2014).*

(Continued)

*Primary Examiner* — Cedric Johnson
(74) *Attorney, Agent, or Firm* — Patrick J. Daugherty; Daugherty & Del Zoppo Co., LPA

(57) ABSTRACT

Aspects provide for design template selectors, wherein processors are configured to determine a design pattern from a user input comprising a spatial arrangement of different discrete constituent design components, and determine that the design pattern input spatial arrangement of constituent components matches a portion of a selected one of a knowledge base plurality of completed design patterns that each comprise different fixed spatial arrangements of discrete constituent components within a threshold amount of confidence. Thus, aspects present the selected one of the knowledge base design patterns to the user as a suggested template for use in completing the design.

17 Claims, 5 Drawing Sheets

(56) References Cited

U.S. PATENT DOCUMENTS

2012/0294514 A1* 11/2012 Saunders ........... G06K 9/00677
                                                            382/159
2013/0109267 A1    5/2013 Schweikardt et al.
2013/0217294 A1    8/2013 Karunaratne
2013/0326439 A1* 12/2013 Matsuoka ............... G06F 30/00
                                                             716/55
2016/0101370 A1    4/2016 Madsen et al.

OTHER PUBLICATIONS

Peter Mell et al, The NIST Definition of Cloud Computing, National Institute of Standards and Technology, Publication 800-145, 2011, entire document.
Ricardo Jota et al, Constructing Virtual 3D Models with Physical Building Blocks, 2011, ACM DL Digital Library, entire document.
Gerd Kortuem et al, Smart objects as building blocks for the Internet of things, 2009, IEEE Computer Society, entire document.
M. Resnick et al, Programmable Bricks: Toys to think with, IBM Systems Journal, Vo. 35, Nos. 3&4, 1996, entire document.
Ayah Bdeir, LEGO-style circuits make for mix-and-match electronics fun for kids, GMA News Onine, 2013, entire document.
Andrew Liszewski, Electronic Bricks Means the Future of Lego is Even More Wonderful, 2013, Gizmodo, entire document.

* cited by examiner

TEMPLATE SELECTOR

BACKGROUND

Aspects of the present invention relate to methods, devices and systems for suggesting appropriate design templates to a user for use by the user in the creation of an object or work of art that meets design objectives of the user.

Visual objects and artistic designs may be defined with respect to patterns of regularity that in some way define or organize parts or all of visible elements (surfaces, structures, textures, etc.) in a consistent, regular manner. For example, a pattern in the visual arts art may be a geometric or other shape discernible in a painting, drawing, tapestry, ceramic tiling, carpet, etc., that repeats or otherwise provides some form or organizing structure in the artwork. Thus, a design pattern or template may refer to the re-usable form of a solution to a design objective or problem, wherein a user may deploy or follow the pattern in creating a work of art having an objective correlated with the pattern. For example, a designer creating a design for a new automobile may use a template derived from a previous automobile to guide the placement and arrangement of surface lines within the new design.

SUMMARY

In one aspect of the present invention, a computerized method for a design template selector includes executing steps on a computer processor. Thus, a computer processor is configured to determine a design pattern from a user input comprising a spatial arrangement of different discrete constituent design components, and determine that the design pattern input spatial arrangement of constituent components matches a portion of a selected one of a knowledge base plurality of completed design patterns that each comprise different fixed spatial arrangements of discrete constituent components within a threshold amount of confidence. Thus, the processor is configured to present the selected one of the knowledge base design patterns to the user as a suggested template for use in completing the design.

In another aspect, a system has a hardware processor in circuit communication with a computer readable memory and a computer-readable storage medium having program instructions stored thereon. The processor executes the program instructions stored on the computer-readable storage medium via the computer readable memory and is thereby configured to determine a design pattern from a user input comprising a spatial arrangement of different discrete constituent design components, and determine that the design pattern input spatial arrangement of constituent components matches a portion of a selected one of a knowledge base plurality of completed design patterns that each comprise different fixed spatial arrangements of discrete constituent components within a threshold amount of confidence. Thus, the processor is configured to present the selected one of the knowledge base design patterns to the user as a suggested template for use in completing the design.

In another aspect, a computer program product for a design template selector has a computer-readable storage medium with computer readable program code embodied therewith. The computer readable hardware medium is not a transitory signal per se. The computer readable program code includes instructions for execution which cause the processor to determine a design pattern from a user input comprising a spatial arrangement of different discrete constituent design components, and determine that the design pattern input spatial arrangement of constituent components matches a portion of a selected one of a knowledge base plurality of completed design patterns that each comprise different fixed spatial arrangements of discrete constituent components within a threshold amount of confidence. Thus, the processor is caused to present the selected one of the knowledge base design patterns to the user as a suggested template for use in completing the design.

BRIEF DESCRIPTION OF THE DRAWINGS

These and other features of embodiments of the present invention will be more readily understood from the following detailed description of the various aspects of the invention taken in conjunction with the accompanying drawings in which.

DETAILED DESCRIPTION

Figure 1:
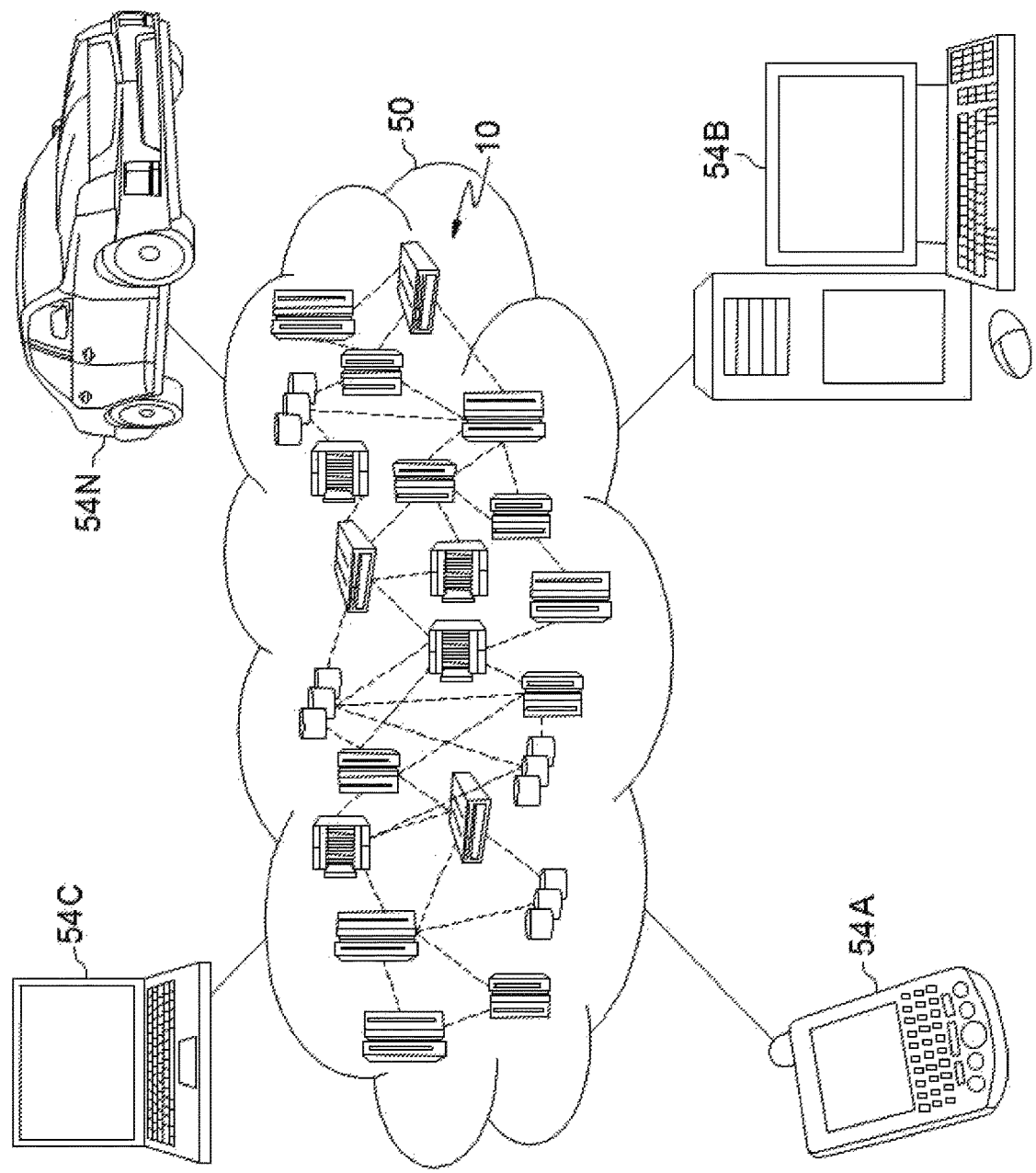
FIG. 1 depicts a cloud computing environment according to an embodiment of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and be rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
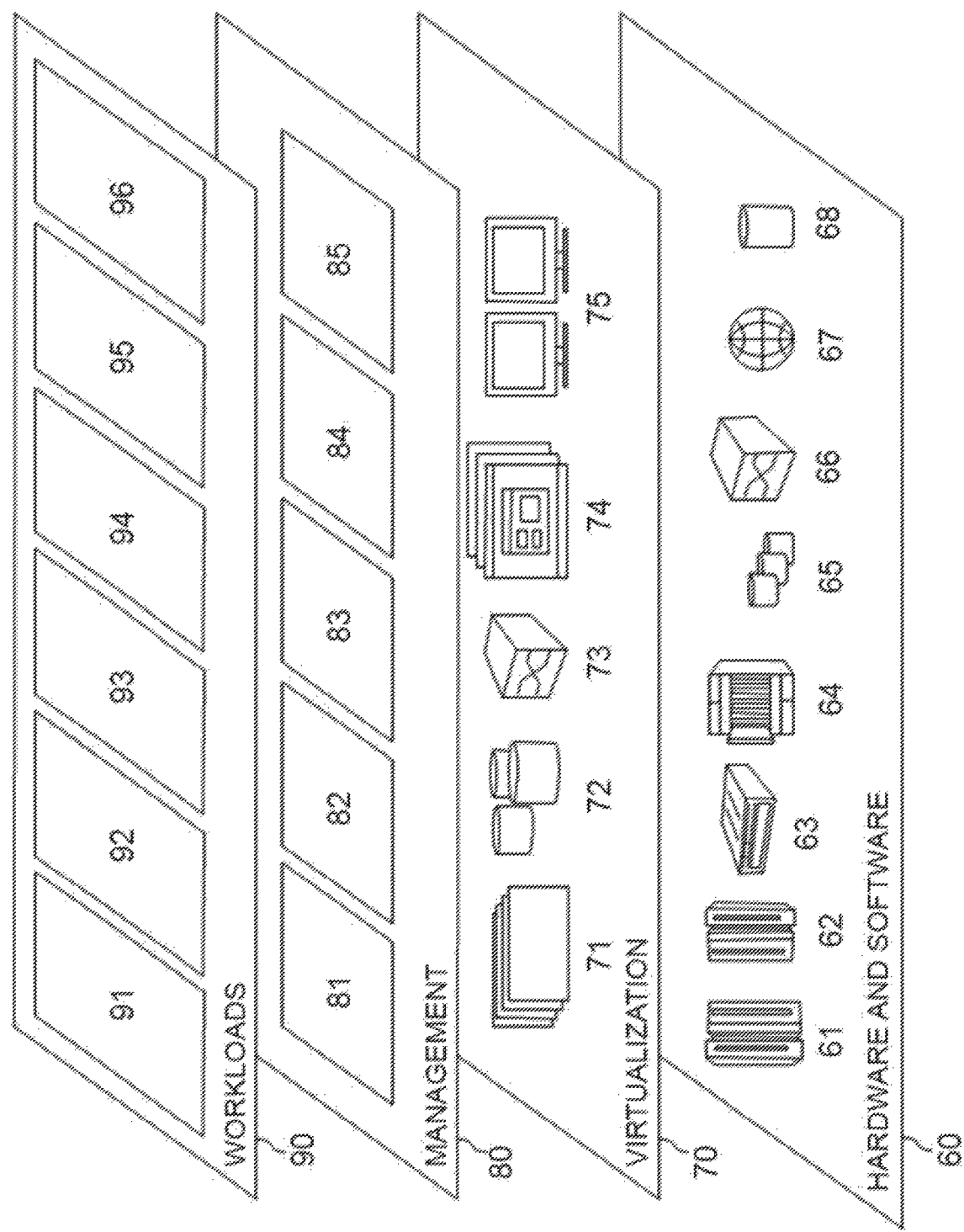
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing for a design template selector according to aspects of the present invention 96.

Figure 3:
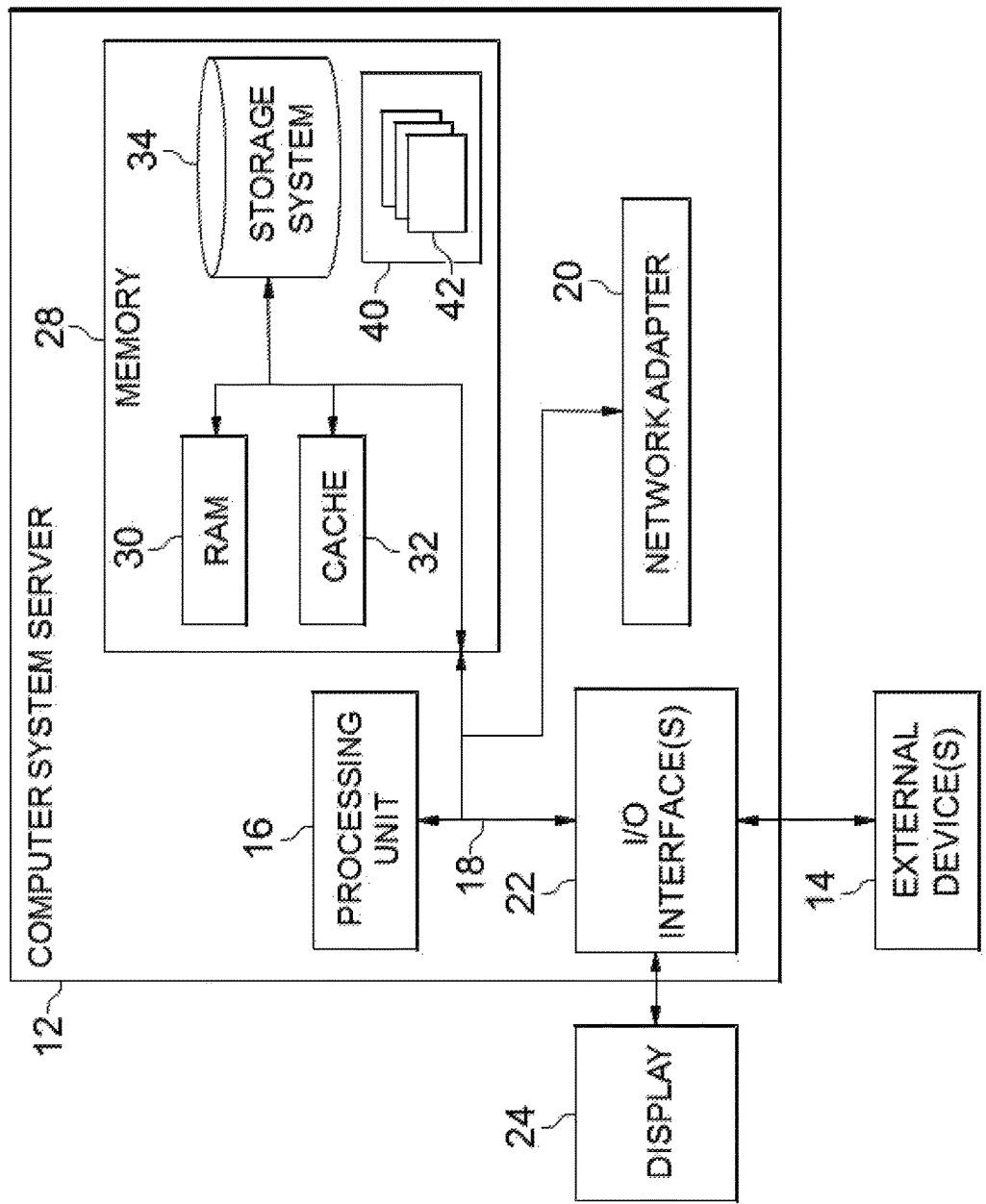
FIG. 3 depicts a computerized aspect according to an embodiment of the present invention.

FIG. 3 is a schematic of an example of a programmable device implementation 10 according to an aspect of the present invention, which may function as a cloud computing node within the cloud computing environment of FIG. 2.

Programmable device implementation 10 is only one example of a suitable implementation and is not intended to suggest any limitation as to the scope of use or functionality of embodiments of the invention described herein. Regardless, programmable device implementation 10 is capable of being implemented and/or performing any of the functionality set forth hereinabove.

A computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 4:
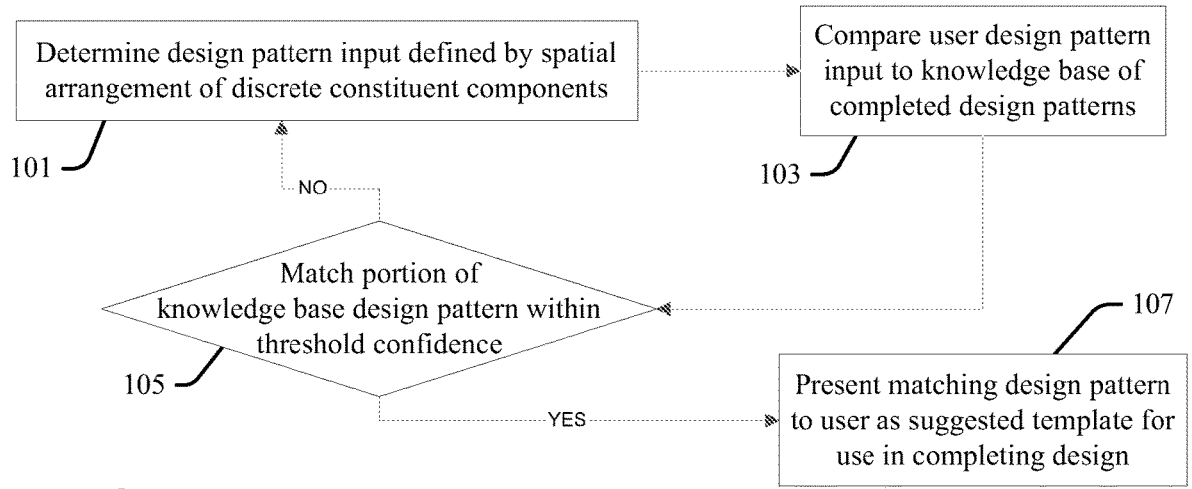
FIG. 4 is a flow chart illustration of an embodiment of the present invention.

FIG. 4 illustrates a design template selector according to the present invention. At 101 a processor configured according to an aspect of the present invention (the "configured processor") determines a design pattern input that is created or otherwise constructed by a user and is defined by a spatial arrangement of a plurality of different, discrete constituent design components relative to each other.

At 103 the configured processor compares the user design pattern input spatial arrangement of constituent components to a knowledge base plurality of completed design patterns that each comprise (are defined by) different fixed spatial arrangements of discrete constituent components that are inclusive of the user design pattern input spatial arrangement.

At 105 the configured processor determines whether the compared user design pattern input matches a portion of one of the knowledge base plurality of completed design patterns within a threshold amount of confidence or similarity.

If at 105 the configured processor does not match a portion of one of the knowledge base plurality of completed design patterns within a threshold amount of confidence or similarity, the configured processor iteratively returns to 101, to await input of a revision of the design pattern input by the user to include an additional discrete constituent component, or a deletion or revision of a current component, thereby generating a revised spatial arrangement of discrete constituent components relative to the arrangement considered in the previous iteration of processes 101, 103 and 105.

Otherwise, if at 105 the configured processor matches a portion of one of the knowledge base plurality of completed design patterns within the threshold amount of confidence or similarity, then at 107 the configured processor presents the design pattern meeting the matching criteria to the user as a suggested template for use in completing the design.

Figure 5:
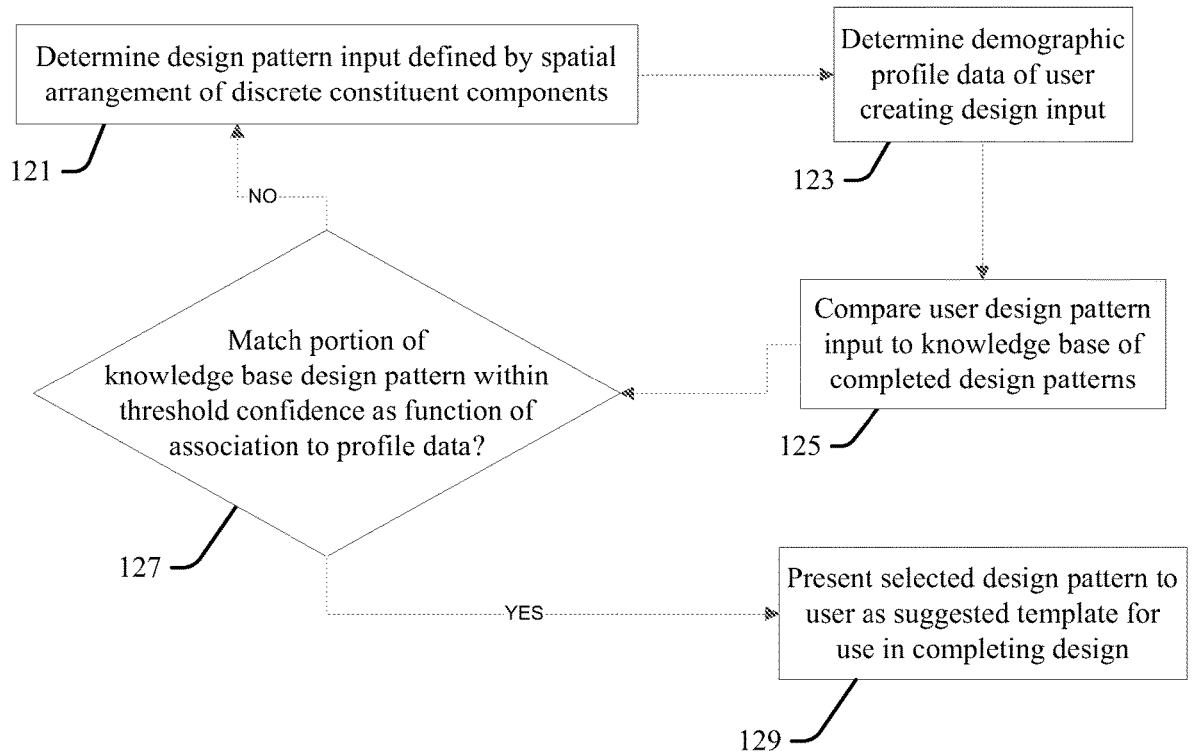
FIG. 5 is a flow chart illustration of another embodiment of the present invention.

FIG. 5 illustrates an alternative embodiment of a design template selector according to the present invention. At 121 a processor configured according to an aspect of the present invention (the "configured processor") determines a design pattern input that is created or otherwise constructed by a user and is defined by a spatial arrangement of a plurality of different, discrete constituent design components relative to each other.

At 123 the configured processor determines demographic profile data of the user creating the design input. Illustrative but not limiting or exhaustive examples of the demographic profile data include occupation; scholastic interests achievements, experience and/or major concentration of studies; hobbies or interests; preferred art or media genres, artists and/or performers; language usage or fluency; interests; age; and still others will be apparent to one skilled in the art.

At 125 the configured processor compares the user design pattern input spatial arrangement of constituent components to a knowledge base plurality of completed design patterns that each comprise (are defined by) different fixed spatial arrangements of discrete constituent components that are inclusive of the user design pattern input spatial arrangement.

At 127 the configured processor determines whether the compared user design pattern input matches a portion of one of the knowledge base plurality of completed design patterns as a function of association to the user profile data within a threshold amount of confidence or similarity.

If at 127 the configured processor does not match a portion of one of the knowledge base plurality of completed design patterns as a function of association to the user profile data within a threshold amount of confidence or similarity, the configured processor iteratively returns to 121, to await input of a revision of the design pattern input by the user to include an additional discrete constituent component, or a deletion or revision of a current component, thereby generating a revised spatial arrangement of discrete constituent components relative to the arrangement considered in the previous iteration of processes 121, 123, 125 and 127.

Otherwise, if at 127 the configured processor matches a portion of one of the knowledge base plurality of completed design patterns as a function of association to the user profile data within the threshold amount of confidence or similarity, then at 129 the configured processor presents the design pattern meeting the matching criteria to the user as a suggested template for use in completing the design.

Figure 6:
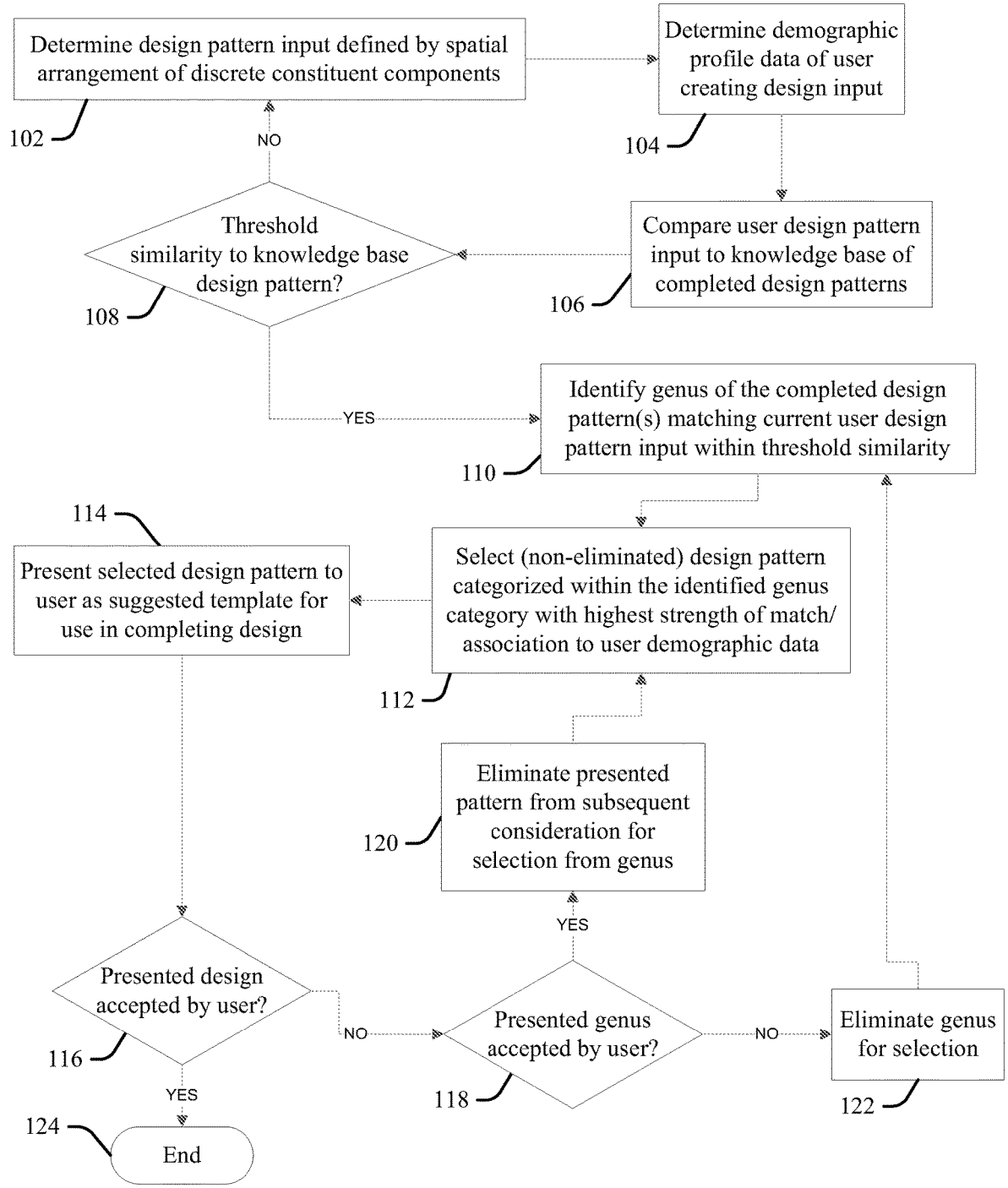
FIG. 6 is a block diagram illustration of another embodiment of the present invention.

FIG. 6 illustrates another alternative design template selector according to the present invention. At 102 a processor configured according to an aspect of the present invention (the "configured processor") determines a design pattern input that is created or otherwise constructed by a user and is defined by a spatial arrangement of a plurality of different, discrete constituent design components relative to each other.

At 104 the configured processor determines demographic profile data of the user creating the design input.

At 106 the configured processor compares the user design pattern input spatial arrangement of constituent components to a knowledge base plurality of completed design patterns that each comprise (are defined by) different fixed spatial arrangements of discrete constituent components that are inclusive of the user design pattern input spatial arrangement.

At 108 the configured processor determines whether the compared user design pattern input has a threshold amount of similarity to one or more of the knowledge base plurality of completed design patterns.

If at 108 the compared user design pattern input does not have a threshold amount of similarity to any of the knowledge base plurality of completed design patterns, the process iteratively returns to 102, to await input of a revision of the design pattern input by the user to include an additional discrete constituent component, or a deletion or revision of a current component, thereby generating a revised spatial arrangement of discrete constituent components relative to the arrangement considered in the previous iteration of processes 102-108.

Thus, the configured processor iteratively repeats the processes at 102 through 108 until determining at 108 that a current compared user design pattern input has a threshold amount of similarity to one or more of the knowledge base plurality of completed design patterns, wherein at 110 the configured processor identifies a genus or other categorization of the completed design pattern(s) matching the current user design pattern input within the threshold amount of similarity.

At 112 the configured processor selects one of the completed design patterns of the identified genus that is categorized within the identified genus and that has a highest strength of match or association to the user demographic data, relative to other patterns within the identified genus.

At 114 the configured processor presents the selected design pattern to the user as a suggested template for use in completing the design.

At 116 the configured processor determines whether the user has accepted the selected design pattern as a suggested template for use in completing the design. If not accepted at 116, (the "No" condition is met), then at 118 the configured processor determines whether the genus is correct or acceptable to the user.

If the genus is correct or acceptable to the user, at 120 the configured processor eliminates the presented pattern from subsequent consideration for selection within the genus at 112 (for example, flagging the presented pattern as non-selectable, or reweights the strengths of match or association of the presented pattern to a value lower than the values of unselected ones of the genus set of patterns, etc.), and returns to the process at 112 to select a different one of the genus patterns at 112 (one having a highest strength of match/association to the user demographic data that has not been previously selected at 112 and presented at 114 with respect to the current input pattern). Alternatively, if the genus is determined to be incorrect or unacceptable to the user at 118, then at 122 the genus is eliminated for selection and the configured processor returns to 110 to identify an alternative genus (for example, a next highest likely genus of the genus categories that applied to the matching design pattern at 110.

The configured processor thereby iteratively repeats selection of completed patterns of appropriate genus category at 112 and presentment at 114, working through alternative, next-highest strength of match/association ones of the completed design patterns of the identified or most-appropriate genus/categorization, after removal of consideration of patterns or genus categories rejected at 116 or 118, until the presented pattern is accepted at 116, (the "Yes" condition is met), wherein the process ends at 124.

Thus, aspects of the present invention autonomously suggest appropriate design templates to meet the objectives of a user in creating a media object or work of art as a function of identifying designs that likely meet the needs and objectives of the user as a function of matching initial design patterns to known patterns, and in some aspects via strength of association to patterns within the knowledge base that are determined or known to be acceptable to other users sharing similar demographic profiles. Aspects provide recommendations, total or partial, of model constructions by guessing user intended construction given the current progress on a construction, wherein the recommendations are based on previously-learned, similar models that are identified within the knowledge base as shared by other builders with having provided construction descriptions and certain user profile demographic or other descriptive data.

Some aspects generate a knowledge base corpus of designs that are each indexed or otherwise organized with respect to construction descriptions and user profile data from structure data inputs received from user design construction activities during the creative process. Structure data inputs may be acquired from connection data transmitted or obtained directly from building blocks or other design elements, or by processing image data obtained from the construction activity or object under construction. The structure data is passed to a recommendation component or system with the user profile data (user demographic information, geographic location, time of creation, etc.) and a description of the creation (for example, "castle of Robin Hood," "Princess castle," etc.).

The user data may be used as an organizing context for the construction, including generically (for example, "11 years old, build cars and castles"), or at more specific granularity (for example, "7 years-old, builds princess-related objects, castles, buildings"). This information is then analyzed and correlated to attributes of user data, construction and construction metadata within the knowledge base corpus, wherein aspects learn additional correlations and relationships by comparing the inputs to other design templates and patterns associated with similar data within the knowledge base.

Some embodiments of the present invention are used to compare and recognize user input design patterns defined by interlocking objects, for example, interlocking building blocks, and thereby suggest appropriate patterns for completed designs to the user so that the user may elect to complete the suggested designs. Some aspects may be configured to interact with "smart bricks" to provide recommendations, total or partial, of model constructions by guessing user intended construction given the current progress on the construction. Such recommendations are based on previously learned similar models shared by other builders, including with certain user profile and provided construction description.

For example, a user may start to build something using building blocks. Processors configured according to the present invention determine (at 101, 121 or 102 above) that an initial construction pattern is defined by a constructed combination of the blocks, such as from capturing an image of the design under construction by the user and comparing the image to knowledge base patterns; through connection data provided by smart or programmable building blocks, that communicate to the configured processor connections made between each block, wherein the configured processor determines spatial relationships of the blocks relative to each other; by actively querying the user (through a graphical user interface, or a conversation enabled by device speakers and microphones) to identify the construction (for example, "Is this a castle?"); and still other design recognition techniques will be apparent to one skilled in the art.

Thus, in response to matching the user design input to patterns found within complete "castle" structure designs, or to an input from the user identifying the initial design construction as a castle, the configured processor determines that the design input is a partially assembled block pattern of a castle, and selects a knowledge base castle pattern to suggest to the user for use in completing the design as a function of strength of similarity to the current user design, and in some aspects as a function of strength of association to profile data of the users. For example, processors configured according to the present invention may determine that the user is within a certain age range and recognize that a movie popular with other users within the same age range within a geographic location of the user features a castle with a distinctive architectural feature, and thereby select a completed castle pattern from the knowledge base for suggestion to the user that includes the distinctive architectural feature.

"Smart" building blocks or construction bricks are ones that incorporate processing units, memory, lights, motors, sensors or other devices, or make circuit connections in assembly with other bricks or components that have said devices. Such smart bricks may store or communicate assembly information (for example, brick colors, types, genus and species or unique identification information, current connections made to other bricks and devices, etc.), and they may also send or receive data and other communications from or to other connected bricks and devices. Depending on node compositions, smart bricks may also process sensor activity (for example, pressure or contact inputs, motion sensors, "squeeze" or tactile touch sensor data, etc.) and responsively coordinate the transmission of data of a current assembly to remote components (including to cloud resources), which may recognize or validate the determined construction patterns and template matches.

Smart bricks may have components differentiated according to their function, and connectivity between bricks enables aspects to identify connection patterns. Aspects may "ping" processing units within smart bricks of an assembly to determine connection points connected, and thereby identify each connected smart brick, and their three-dimensional arrangement relative to each other via identification indicia transmitted or broadcast by the smart bricks (for example via Bluetooth®, cellular data, Wifi, RFID or other communication protocol). (BLUETOOTH is a trademark of Bluetooth Special Interest Group (SIG) in the United States or other countries.)

Thus, in one example, assembly of a brick "B" is determined to be a control node brick in response to its status as a first brick comprising a communication component that is added to the user construction. Assembly data sent to remote device by a control node B can be detailed or simple: for example:

"A<->B<->C" identifies the control node B and bricks "A" and "C" connected thereto;

"A(Type: ABC, color: light blue)<->B(Type: MNO, color: blue)<->C (Type: XYZ, color: green)" includes different type of block and color information of the bricks; and A(Type: ABC, color: light blue, connections:{A4-B2, A5-B1})<->B(Type: MNO, color: blue, connections:{B1-A5, B2-A4, B3-C6})<->C (Type: XYZ, color: green, connections:{C6-B3})" communicates the respective connections of each of the bricks to other individual bricks within an assembly that are in circuit or physical (contact) connection with each of the bricks.

Aspects of the present invention use such connection and spatial relationship information to search learned models for matching patterns that fit user characteristics and profile data. Similar models are searched by comparing construction and smart bricks data, similar to graph comparison, taking into account block connections, colors, types, etc., as well as other contained data. For example, a current user construction input may comprise the following:

A (Type: ABC, color: light blue, connections: {A4-B2, A5-B1})<-connected to->Brick B(Type: MNO, color: blue, connections:{31-A5, B2-A4, B3-C6})<-Connected to->C (Type: XYZ, color: green, connections:{C6-B3}).

Aspects of the present invention may match this pattern data as close enough (within a tolerance of precision) with the following knowledge base pattern that is associated with learned constructions for users with similar profile data:

A(Type: ABC, color: light blue, connections: { A4-B2, A5-B1})<-connected to->Brick B(Type: MNO, color: blue, connections:{B1-A5, B2-A4})<-Connected to->C (Type: RST, color: green, connections:{C6-B3})

Such comparisons enable aspects of the present invention to guess user intention via matching information of partially similar constructions and extracting metadata relevant thereto. For example, at an early stage of user construction, the aspects may determine that there is a 5% match of a user assembly of blocks to block patterns within a knowledge base template labeled as a "house" type of construction; 10% to a "church" template; and 2% to a "castle" template; and wherein with the construction in more advanced status the aspects determine that there is 50% strength of match or similarity to similitude to "castle" types of models, and with a 40% match to a species of the castle genus that is labeled as "middle-ages northern Italian tower castle." In response to determining that the user profile is an 8-year old, and that the strength of association of 8-year old's to completed constructions of "middle-ages northern Italian tower castle" is strong due to popularity of a television show set in northern Italy during the middle ages time period and featuring tower castles as settings, raises the strength of match of the "middle-ages northern Italian tower castle" species template, to improve the likelihood that it is selected and presented to the user relative to other "castle" patterns, as well as relative to the "house" and "church" patterns.

Other embodiments of the present invention are configured to recognize constituent parts of a drawing design (image, visual element, etc.) under dynamic construction by a user, to thereby recognize or predict the completed design under construction and responsively suggest templates to the user for use in completing the design. Drawing generally refers to the marking of lines and areas of tone onto paper or other tangible, two-dimensional materials or curved surfaces, or the rendering of the same on a computer display screen, in order to generate a rendering or representation of a visual element comprising known objects of the visual domain, or stylistic designs that are recognizable and reproducible (for example, logos, trademark designs, numbers, letters, symbols, icons, etc.). Illustrative but not limiting or exhaustive examples of types or categories of drawing include figure drawing, cartooning, doodling, free hand and shading.

Thus, processors configured according to the present invention determine (at 101, 121 or 102 above) that an initial image drawing pattern is defined by a constructed combination of different line segments, color and shading tones, shapes, text content, etc., such as from capturing an image of the design under construction by the user and comparing the image to knowledge base patterns, including through movement and ink or other material deposition upon paper media as determined by a "smart pen." Smart or digital pens generally refer to input devices that capture analog signals or representations of handwriting or brush strokes and transform or convert them into a digital data outputs for processing and further in various applications. Smart pens may contain internal processing and electronics to determine touch sensitivity inputs and transmit the data to a networked device or resource, or retain the data within internal memory for subsequent transmission. Smart pens may also be configured for use with digital notebook or stylus applications resident within another device: sometimes referred to as "active" pens or stylus, such devices are configured to enable a user to write directly onto a Liquid Crystal Display (LCD) screen surface of a computing device paired to the active pen (for example, the screen of a smartphone, tablet computer, etc.), wherein the paired devices perform data capture, transformation or analysis functions.

Aspects may identify drawing patterns by actively querying the user (through a graphical user interface, or a conversation enabled by device speakers and microphones) to identify the image being drawn (for example, "Is this a picture of an automobile?"). Still other drawing or object recognition techniques will be apparent to one skilled in the art.

Thus, in response to matching initial drawing inputs from the user to patterns within images of objects, scenery, people, icons, etc., or to an input from the user identifying the drawing currently being generated by the user, the configured processor determines that the design input is a partially assembled block pattern of an automobile and selects a knowledge base drawing template, including selecting a template that most closely matches the media, color or style of the current drawing input, to suggest to the user for use in completing the design as a function of strength of similarity to the current user design, and in some aspects as a function of strength of association to profile data of the users. For example, processors configured according to the present invention may determine that the user is a college student studying engineering and thereby select a completed automobile schematic drawing that emphasizes mechanical parts of the automobile for suggestion to the user to use as a reference during completion of the drawing.

The terminology used herein is for describing aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification specify the presence of stated features, integers, steps, operations, elements, and/or components, but do not preclude the presence or addition of one or more other features, integers, steps, operations, elements, components, and/or groups thereof. Certain examples and elements described in the present specification, including in the claims, and as illustrated in the figures, may be distinguished, or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations, or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for a design template selector, the method comprising executing on a computer processor:
determining a design pattern input from a user comprising a spatial arrangement of a plurality of different discrete constituent design components;
determining that the design pattern input spatial arrangement of constituent components matches portions of each of a subset of a knowledge base plurality of completed design patterns that each comprise different fixed spatial arrangements of discrete constituent components;
determining demographic profile data of the user;
determining as a function of association to the user demographic data that the design pattern input spatial arrangement of the constituent components matches a selected one of the subset of the knowledge base plurality of completed design patterns with a highest percentage of match relative to others of the subset of the knowledge base plurality of completed design patterns; and
presenting the selected one of the knowledge base design patterns to the user as a suggested template for use in completing the design.

2. The method of claim 1, further comprising:
integrating computer-readable program code into a computer system comprising a processor, a computer readable memory in circuit communication with the processor, and a computer readable storage medium in circuit communication with the processor; and
wherein the processor executes program code instructions stored on the computer-readable storage medium via the computer readable memory and thereby performs the determining the design pattern input from the user, the determining that the design pattern input spatial arrangement of constituent components matches the portions of each of the subset of the knowledge base plurality of completed design patterns, the determining that the design pattern input spatial arrangement of the constituent components matches the selected one of the subset of the knowledge base plurality of completed design patterns, and the presenting the selected one of the knowledge base design patterns to the user as the suggested template for use in completing the design.

3. The method of claim 2, wherein the computer-readable program code is provided as a service in a cloud environment.

4. The method of claim 1, further comprising:
identifying a genus category of a preliminary matching one of the knowledge base plurality of completed design patterns that matches the design pattern input spatial arrangement of constituent components with a highest percentage of match relative to others of the plurality of completed design patterns; and
selecting the selected one of the knowledge base design patterns as a function of categorization within the identified genus category and having a highest strength of association to the user demographic data, relative to others of the patterns that are categorized within the identified genus category.

5. The method of claim 1, wherein the demographic profile data is selected from the group consisting of an occupation, a scholastic interest, a hobby, a preferred art genre, a preferred artist, a preferred performer, and a language usage.

6. The method of claim 1, wherein the different discrete constituent design components of the user design pattern input are building blocks; and
wherein determining the spatial arrangement of the building blocks of the design pattern input from the user is selected from the group consisting of:
capturing an image of the design under construction by the user and comparing the image to knowledge base patterns; and
determining connection data provided by the building blocks.

7. The method of claim 1, wherein the different discrete constituent design components of the user design pattern input are line segments that define a partial drawing of an object; and
wherein determining the spatial arrangement of the building blocks of the design pattern input from the user is selected from the group consisting of:
capturing an image of the partial drawing of an object and comparing the image to knowledge base patterns; and
identifying the line segments from data provided by a smart pen.

8. A system, comprising:
a processor;
a computer readable memory in circuit communication with the processor; and
a computer readable storage medium in circuit communication with the processor;
wherein the processor executes program instructions stored on the computer-readable storage medium via the computer readable memory and thereby:
determines a design pattern input from a user comprising a spatial arrangement of a plurality of different discrete constituent design components;
determines that the design pattern input spatial arrangement of constituent components matches portions of each of a subset of a knowledge base plurality of completed design patterns that each comprise different fixed spatial arrangements of discrete constituent components;
determines demographic profile data of the user;
determines as a function of association to the user demographic data that the design pattern input spatial arrangement of the constituent components matches a selected one of the subset of the knowledge base plurality of completed design patterns with a highest percentage of match relative to others of the subset of the knowledge base plurality of completed design patterns; and
presents the selected one of the knowledge base design patterns to the user as a suggested template for use in completing the design.

9. The system of claim 8, wherein the processor executes the program instructions stored on the computer-readable storage medium via the computer readable memory and thereby:
identifies a genus category of a preliminary matching one of the knowledge base plurality of completed design patterns that matches the design pattern input spatial arrangement of constituent components with a highest percentage of match relative to others of the plurality of completed design patterns; and selects the selected one of the knowledge base design patterns as a function of categorization within the identified genus category and having a highest strength of association to the user demographic data, relative to others of the patterns that are categorized within the identified genus category.

10. The system of claim 8, wherein the demographic profile data is selected from the group consisting of an occupation, a scholastic interest, a hobby, a preferred art genre, a preferred artist, a preferred performer, and a language usage.

11. The system of claim 8, wherein the different discrete constituent design components of the user design pattern input are building blocks; and wherein the processor executes the program instructions stored on the computer-readable storage medium via the computer readable memory and thereby determines the spatial arrangement of the building blocks of the design pattern input from the user from an action that is selected from the group consisting of:

capturing an image of the design under construction by the user and comparing the image to knowledge base patterns; and determining connection data provided by the building blocks.

12. The system of claim 8, wherein the different discrete constituent design components of the user design pattern input are line segments that define a partial drawing of an object; and wherein the processor executes the program instructions stored on the computer-readable storage medium via the computer readable memory and thereby determines the spatial arrangement of the building blocks of the design pattern input from the user from an action that is selected from the group consisting of:

capturing an image of the partial drawing of an object and comparing the image to knowledge base patterns; and identifying the line segments from data provided by a smart pen.

13. A computer program product for a design template selector, the computer program product comprising:

a computer readable storage medium having computer readable program code embodied therewith, wherein the computer readable storage medium is not a transitory signal per se, the computer readable program code comprising instructions for execution by a processor that cause the processor to:

determine a design pattern input from a user comprising a spatial arrangement of a plurality of different discrete constituent design components;

determine that the design pattern input spatial arrangement of constituent components matches portions of each of a subset of a knowledge base plurality of completed design patterns that each comprise different fixed spatial arrangements of discrete constituent components;

determine demographic profile data of the user;

determine as a function of association to the user demographic data that the design pattern input spatial arrangement of the constituent components matches a selected one of the subset of the knowledge base plurality of completed design patterns with a highest percentage of match relative to others of the subset of the knowledge base plurality of completed design patterns; and present the selected one of the knowledge base design patterns to the user as a suggested template for use in completing the design.

14. The computer program product of claim 13, wherein the computer readable program code instructions for execution by the processor further cause the processor to:

identify a genus category of a preliminary matching one of the knowledge base plurality of completed design patterns that matches the design pattern input spatial arrangement of constituent components with a highest percentage of match relative to others of the plurality of completed design patterns; and select the selected one of the knowledge base design patterns as a function of categorization within the identified genus category and having a highest strength of association to the user demographic data, relative to others of the patterns that are categorized within the identified genus category.

15. The computer program product of claim 13, wherein the demographic profile data is selected from the group consisting of an occupation, a scholastic interest, a hobby, a preferred art genre, a preferred artist, a preferred performer, and a language usage.

16. The computer program product of claim 13, wherein the different discrete constituent design components of the user design pattern input are building blocks; and wherein the computer readable program code instructions for execution by the processor further cause the processor to determine the spatial arrangement of the building blocks of the design pattern input from the user from an action that is selected from the group consisting of:

capturing an image of the design under construction by the user and comparing the image to knowledge base patterns; and determining connection data provided by the building blocks.

17. The computer program product of claim 13, wherein the different discrete constituent design components of the user design pattern input are line segments that define a partial drawing of an object; and wherein the computer readable program code instructions for execution by the processor further cause the processor to determine the spatial arrangement of the building blocks of the design pattern input from the user from an action that is selected from the group consisting of:

capturing an image of the partial drawing of an object and comparing the image to knowledge base patterns; and identifying the line segments from data provided by a smart pen.

* * * * *